(12) United States Patent
Djelloul-Mazouz et al.

(10) Patent No.: US 9,352,615 B2
(45) Date of Patent: May 31, 2016

(54) PNEUMATIC TIRE WITH MULTI-TREAD CAP

(71) Applicant: The Goodyear Tire & Rubber Company, Akron, OH (US)

(72) Inventors: Malik Djelloul-Mazouz, Bereldange (LU); Pascal Patrick Steiner, Diekirch (LU); Julien Dominique Gilbert Majerus, Bastogne (BE); Olivier Francis Bindner, Yutz (FR); Bruno Pierre Maitre, Strassen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 408 days.

(21) Appl. No.: 14/059,866

(22) Filed: Oct. 22, 2013

(65) Prior Publication Data

US 2015/0107735 A1     Apr. 23, 2015

(51) Int. Cl.
*B60C 1/00*     (2006.01)
*B60C 11/00*     (2006.01)
*B60C 19/08*     (2006.01)

(52) U.S. Cl.
CPC ........... *B60C 1/0016* (2013.04); *B60C 11/0008* (2013.04); *B60C 11/0058* (2013.04); *B60C 11/0066* (2013.04); *B60C 19/082* (2013.04); *B60C 2011/0025* (2013.04); *B60C 2011/0033* (2013.04)

(58) Field of Classification Search
CPC ........ B60C 1/00; B60C 1/0016; B60C 11/00; B60C 11/005; B60C 11/0008; B60C 2011/0025; B60C 11/0058; B60C 11/0066; B60C 19/082; B60C 11/0041; B60C 11/0075

USPC .................................. 152/209.5, 209.8, 905
See application file for complete search history.

(56) References Cited

U.S. PATENT DOCUMENTS

| 1,769,694 A | 7/1930 | Jenkinson |
| 2,224,141 A | 12/1940 | Clark |
| 2,445,725 A | 7/1948 | Walker |
| 3,364,965 A | 1/1968 | Oubridge |

(Continued)

FOREIGN PATENT DOCUMENTS

| EP | 1 398 182 A2 | 3/2004 |
| EP | 2 108 528 A1 | 10/2009 |

(Continued)

OTHER PUBLICATIONS

Extended European Search Report dated Mar. 2, 2015 for European Patent Application No. 14 189 296.8.

*Primary Examiner* — Eric Hug
(74) *Attorney, Agent, or Firm* — Robert N. Lipcsik

(57) ABSTRACT

A tread for a pneumatic tire in accordance with the present invention includes a tread base layer, a first tread cap layer radially outside of the tread base layer, a second tread cap layer radially outside of the tread base layer and both radially outside and axially adjacent the first tread cap layer, a third intermediate layer radially between the tread base layer and the first and second tread cap layers. The first tread cap layer has a protrusion extending radially inward and into the third intermediate layer more than a main body of the first tread cap layer and the second tread cap layer thereby allowing the first tread cap layer to provide the overall tread with enhanced performance characteristics after the main body of the first tread cap layer and the second tread cap layer have worn away.

8 Claims, 1 Drawing Sheet

(56) References Cited

U.S. PATENT DOCUMENTS

| | | |
|---|---|---|
| 3,537,500 A | 11/1970 | Beneze |
| 3,759,306 A | 9/1973 | Greiner et al. |
| 3,931,844 A | 1/1976 | Mirtain |
| 4,385,653 A | 5/1983 | Okazaki et al. |
| 4,580,608 A | 4/1986 | Rampl |
| 4,838,330 A | 6/1989 | Takayama |
| 5,225,011 A | 7/1993 | Takino et al. |
| 5,937,926 A | 8/1999 | Powell |
| 6,216,757 B1 | 4/2001 | Ohara et al. |
| 6,474,382 B1 | 11/2002 | Finck |
| 6,523,585 B1 | 2/2003 | Ducci et al. |
| 6,540,858 B1 | 4/2003 | Caretta et al. |
| 6,719,025 B2 | 4/2004 | Caretta et al. |
| 7,441,572 B2 * | 10/2008 | Weydert ............... B60C 1/0016 152/209.1 |
| 7,559,348 B2 | 7/2009 | Puhala et al. |
| 7,789,117 B2 | 9/2010 | Puhala et al. |
| 2004/0112490 A1 | 6/2004 | Sandstrom |
| 2004/0118495 A1 | 6/2004 | Sandstrom et al. |
| 2007/0221303 A1 * | 9/2007 | Sandstrom ............ B60C 1/0016 152/209.5 |
| 2010/0059156 A1 * | 3/2010 | Cambron ............... B60C 11/00 152/209.5 |
| 2012/0138203 A1 * | 6/2012 | Kaes ..................... B60C 1/0016 152/450 |
| 2013/0048169 A1 | 2/2013 | Erceg et al. |
| 2014/0041777 A1 * | 2/2014 | Djelloul-Mazouz .. B60C 11/005 152/209.5 |

FOREIGN PATENT DOCUMENTS

| | | |
|---|---|---|
| EP | 2 565 056 A1 | 3/2013 |
| FR | 2 952 855 A1 | 5/2011 |

* cited by examiner

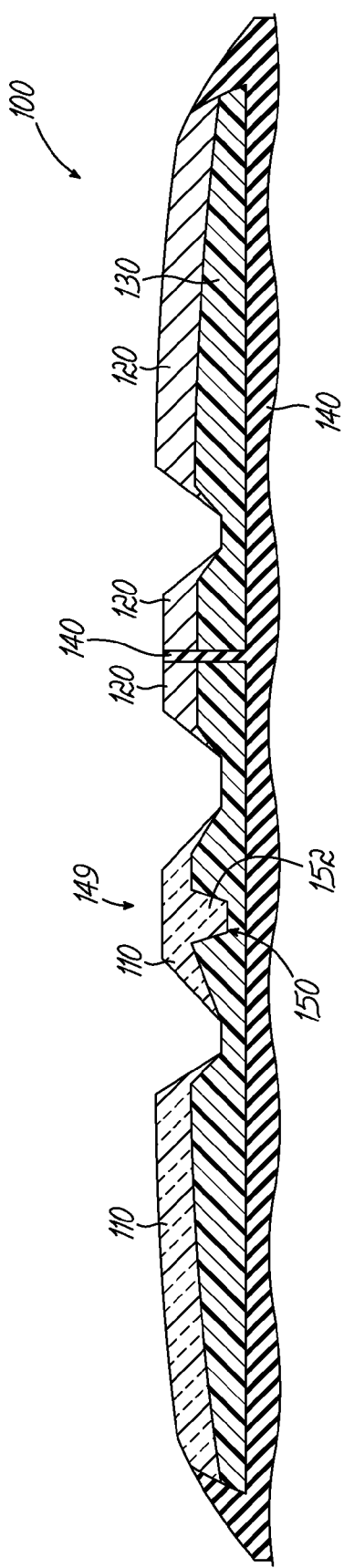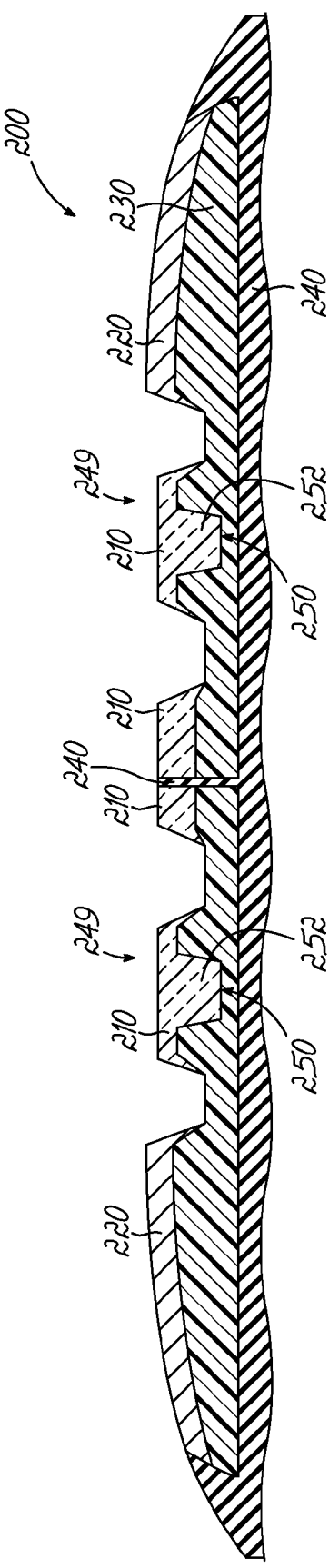

PNEUMATIC TIRE WITH MULTI-TREAD CAP

BACKGROUND OF THE INVENTION

Pneumatic tires have traditionally been constructed by applying an outer homogenous tread stock over a supporting carcass structure and vulcanizing the resulting composite structure. An outer matrix of grooves is molded or otherwise provided in the outer portions of this homogenous tread stock to provide traction as well as other desirable characteristics.

Certain tread compounds provide better traction than others. Also, certain tread compounds provide better rolling resistance than others. Although a tire which has both low rolling resistance and a maximum amount of traction is desirable, a tread compound which provides good rolling resistance in a tire may not generally provide a maximum amount of traction, and a tread compound which provides a maximum amount of traction may not provide as low of rolling resistance as may be desired.

Pneumatic tires having a tread/running surface comprised of a silica-rich rubber composition, while sometimes desirable to impart various physical properties to the tire tread such as, for example, reduced rolling resistance and suitable traction, may be disadvantageous because of the relatively high ratio of silica to carbon black in the reinforcing filler content. Such high silica/carbon black ratios represent a significant increase in cost of the silica-rich tread in terms of increased material cost (the silica) and increased cost of processing the silica-rich rubber composition. Further, such silica-rich tread rubber, with its minimal carbon black content, may have a relatively low electrical conductivity and may therefore be electrically resistive to conducting static electrical charge from the tire tread to the ground.

A path of increased electrical conductivity for a silica-rich tread may be provided, for example, by positioning a strip of a carbon black rich rubber composition either as a thin cover strip over a portion of the running surface of the tread or as a thin, non load bearing, strip extending through the body of the tread to its running surface. Methods of such type add both cost and complexity to the tire itself and to the manufacturing procedure for the tire.

Some tire treads have a cap/base construction, with the tread cap designed to be ground-contacting with a lug/groove configuration, and with the tread base underlying and supporting the tread cap and positioned between the tread cap and the tire carcass/belt structure. The tread base is not intended to be ground-contacting and, thus, not normally intended to have the same tread properties as, for example, the desired tread cap properties of traction and treadwear.

While the tread cap, in a tread cap/base construction, may be designed to be ground-contacting and, therefore, provide traction in combination with acceptable tread wear and rolling resistance, the underlying tread base may be designed to fulfill an entirely different function and not be designed to be ground-contacting at all. In particular, the tread base may fulfill a function of transmitting multiaxial tread cap forces to the tire carcass, usually with relatively low heat generation. These forces may include forces resulting from the tread cap working under forces such as compression, bending, and/or shear, all of which may generate heat, cause temperature build-up, and cause the forces to undesirably impact on the tire carcass itself. Such forces may result, for example, from the tire's cornering, braking, and/or varied handling activities, all of which may generate heat within the tire tread.

In one conventional pneumatic tire, in order to both reduce the material and fabrication cost of a silica-rich tread and also provide a path of increased electrical conductivity from the tire through its tread to the ground, a tread running surface may be divided into three distinct load bearing zones, which may include at least one silica-rich load bearing zone and at least one carbon black-rich load bearing zone of rubber compositions. By requiring the tread cap zones to be load-bearing, each of the three distinct running surface tread cap zones may extend from the outer surface of the tread to the underlying distinct carbon black-rich tread base rubber layer so that all of the load on the tire is communicated by each of the three tread cap layer zones directly to the tread base layer instead of directly to the tire carcass itself.

SUMMARY OF THE INVENTION

A tread for a pneumatic tire in accordance with the present invention includes a tread base layer, a first tread cap layer radially outside of the tread base layer, a second tread cap layer radially outside of the tread base layer and both radially outside and axially adjacent the first tread cap layer, a third intermediate layer radially between the tread base layer and the first and second tread cap layers. The first tread cap layer has a protrusion extending radially inward and into the third intermediate layer more than a main body of the first tread cap layer and the second tread cap layer thereby allowing the first tread cap layer to provide the overall tread with enhanced performance characteristics after the main body of the first tread cap layer and the second tread cap layer have worn away.

According to another aspect of the tread, the protrusion extends radially inward from a rib of a four rib tread and another rib of the four rib tread comprises a structure for grounding a static charge.

According to still another aspect of the tread, two protrusions each extend radially inward from two ribs of a five rib tread.

According to yet another aspect of the tread, two protrusions each extend radially inward from two ribs of a five rib tread and a middle rib of the five rib tread comprises a structure for grounding a static charge.

According to still another aspect of the tread, the tread base layer comprises a rubber composition comprising a diene based elastomer having from 20 part by weight to 150 part by weight, per 100 parts by weight of elastomer, of carbon black.

According to yet another aspect of the tread, the second tread cap layer comprises a diene based elastomer having from 20 parts by weight to 100 parts by weight, per 100 parts by weight of elastomer, of silica.

According to still another aspect of the tread, the tread base layer has a tan delta ranging from 0.1 to 0.2, a storage modulus ranging from 4 MPa to 13 MPa, and a shore A hardness ranging from 45 to 70.

According to yet another aspect of the tread, the second tread cap layer has a tan delta ranging from 0.05 to 0.20, a storage modulus ranging from 4 MPa to 12 MPa, and a shore A hardness ranging from 50 to 75.

According to still another aspect of the tread, the second tread cap layer comprises a conjugated diene-based elastomer having from about 30 phr to about 70 phr of rubber reinforcing filler having from 30 phr to 80 phr carbon black and zero to 40 phr precipitated silica.

According to yet another aspect of the tread, the second tread cap layer comprises 50 phr to 80 phr carbon black.

According to still another aspect of the tread, the second tread cap layer comprises 10 phr to 25 phr precipitated silica.

According to yet another aspect of the tread, the second tread cap layer comprises a conjugated diene-based elastomer and a reinforcing filler having 50 phr to 80 phr precipitated silica and 10 phr to 40 phr carbon black.

A pneumatic tire in accordance with the present invention includes a tread, a carcass, a belt layer, spaced apart relatively inextensible beads, and sidewalls. The tread has a tread base layer, a first tread cap layer radially outside of the tread base layer, a second tread cap layer radially outside of the tread base layer and both radially outside and axially adjacent the first tread cap layer, a third intermediate layer radially between the tread base layer and the first and second tread cap layers, the first tread cap layer having a protrusion extending radially inward and into the third intermediate layer more than a main body of the first tread cap layer and the second tread cap layer thereby allowing the first tread cap layer to provide the overall tread with enhanced performance characteristics after the main body of the first tread cap layer and the second tread cap layer have worn away.

According to another aspect of the pneumatic tire, the first tread cap layer is extruded as a unitary extrudate of a single rubber compound in one extruder and the second cap layer is extruded by another extruder.

According to still another aspect of the pneumatic tire, the second tread cap layer comprises a conjugated diene-based elastomer having from about 30 phr to about 70 phr of rubber reinforcing filler having from 30 phr to 80 phr carbon black and zero to 40 phr precipitated silica.

According to yet another aspect of the pneumatic tire, the second tread cap layer comprises 50 phr to 80 phr carbon black.

According to still another aspect of the pneumatic tire, the second tread cap layer comprises 10 phr to 25 phr precipitated silica.

According to yet another aspect of the pneumatic tire, the second tread cap layer has a storage modulus ranging from 4 MPa to 13 MPa.

According to still another aspect of the pneumatic tire, the second tread cap layer comprises a conjugated diene-based elastomer and a reinforcing filler having 50 phr to 80 phr precipitated silica and 10 phr to 40 phr carbon black.

According to yet another aspect of the pneumatic tire, the tread base layer has a tan delta ranging from 0.1 to 0.2, a storage modulus ranging from 4 MPa to 13 MPa, and a shore A hardness ranging from 45 to 70.

According to still another aspect of the pneumatic tire, the second tread cap layer has a tan delta ranging from 0.05 to 0.20, a storage modulus ranging from 4 MPa to 12 MPa, and a shore A hardness ranging from 50 to 75.

BRIEF DESCRIPTION OF THE DRAWINGS

FIG. 1 is a schematic cross section of one example pneumatic tire in accordance with the present invention.

FIG. 2 is a schematic cross section of another example pneumatic tire in accordance with the present invention.

DEFINITIONS

The following definitions are controlling for the present invention.

"Apex" means an elastomeric filler located radially above the bead core and between the plies and the turnup ply.

"Annular" means formed like a ring.

"Aspect ratio" means the ratio of its section height to its section width.

"Asymmetric tread" means a tread that has a tread pattern not symmetrical about the centerplane or equatorial plane EP of the tire.

"Axial" and "axially" are used herein to refer to lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt structure" means at least two annular layers or plies of parallel cords, woven or unwoven, underlying the tread, unanchored to the bead, and having cords inclined respect to the equatorial plane of the tire. The belt structure may also include plies of parallel cords inclined at relatively low angles, acting as restricting layers.

"Bias tire" (cross ply) means a tire in which the reinforcing cords in the carcass ply extend diagonally across the tire from bead to bead at about a 25° to 65° angle with respect to equatorial plane of the tire. If multiple plies are present, the ply cords run at opposite angles in alternating layers.

"Breakers" means at least two annular layers or plies of parallel reinforcement cords having the same angle with reference to the equatorial plane of the tire as the parallel reinforcing cords in carcass plies. Breakers are usually associated with bias tires.

"Cable" means a cord formed by twisting together two or more plied yarns.

"Carcass" means the tire structure apart from the belt structure, tread, undertread, and sidewall rubber over the plies, but including the beads.

"Casing" means the carcass, belt structure, beads, sidewalls and all other components of the tire excepting the tread and undertread, i.e., the whole tire.

"Chipper" refers to a narrow band of fabric or steel cords located in the bead area whose function is to reinforce the bead area and stabilize the radially inwardmost part of the sidewall.

"Circumferential" means lines or directions extending along the perimeter of the surface of the annular tire parallel to the Equatorial Plane (EP) and perpendicular to the axial direction; it can also refer to the direction of the sets of adjacent circular curves whose radii define the axial curvature of the tread, as viewed in cross section.

"Cord" means one of the reinforcement strands of which the reinforcement structures of the tire are comprised.

"Cord angle" means the acute angle, left or right in a plan view of the tire, formed by a cord with respect to the equatorial plane. The "cord angle" is measured in a cured but uninflated tire.

"Crown" means that portion of the tire within the width limits of the tire tread.

"Denier" means the weight in grams per 9000 meters (unit for expressing linear density). "Dtex" means the weight in grams per 10,000 meters.

"Density" means weight per unit length.

"Elastomer" means a resilient material capable of recovering size and shape after deformation.

"Equatorial plane (EP)" means the plane perpendicular to the tire's axis of rotation and passing through the center of its tread; or the plane containing the circumferential centerline of the tread.

"Fabric" means a network of essentially unidirectionally extending cords, which may be twisted, and which in turn are composed of a plurality of a multiplicity of filaments (which may also be twisted) of a high modulus material.

"Fiber" is a unit of matter, either natural or man-made that forms the basic element of filaments. Characterized by having a length at least 100 times its diameter or width.

"Filament count" means the number of filaments that make up a yarn. Example: 1000 denier polyester has approximately 190 filaments.

"Flipper" refers to a reinforcing fabric around the bead wire for strength and to tie the bead wire in the tire body.

"Footprint" means the contact patch or area of contact of the tire tread with a flat surface at zero speed and under normal load and pressure.

"Gauge" refers generally to a measurement, and specifically to a thickness measurement.

"Groove" means an elongated void area in a tread that may extend circumferentially or laterally about the tread in a straight, curved, or zigzag manner. Circumferentially and laterally extending grooves sometimes have common portions. The "groove width" may be the tread surface occupied by a groove or groove portion divided by the length of such groove or groove portion; thus, the groove width may be its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves, which they interconnect, they may be regarded as forming "tie bars" tending to maintain a rib-like character in the tread region involved. As used herein, a groove is intended to have a width large enough to remain open in the tires contact patch or footprint.

"High Tensile Steel (HT)" means a carbon steel with a tensile strength of at least 3400 MPa at 0.20 mm filament diameter.

"Inner" means toward the inside of the tire and vehicle and "outer" means toward their exterior.

"Innerliner" means the layer or layers of elastomer or other material that form the inside surface of a tubeless tire and that contain the inflating fluid within the tire.

"Inboard side" means the side of the tire nearest the vehicle when the tire is mounted on a wheel and the wheel is mounted on the vehicle.

"LASE" is load at specified elongation.

"Lateral" means an axial direction.

"Lay length" means the distance at which a twisted filament or strand travels to make a 360 degree rotation about another filament or strand.

"Load Range" means load and inflation limits for a given tire used in a specific type of service as defined by tables in The Tire and Rim Association, Inc.

"Mega Tensile Steel (MT)" means a carbon steel with a tensile strength of at least 4500 MPa at 0.20 mm filament diameter.

"Net contact area" means the total area of ground contacting elements between defined boundary edges divided by the gross area between the boundary edges as measured around the entire circumference of the tread.

"Net-to-gross ratio" means the total area of ground contacting tread elements between lateral edges of the tread around the entire circumference of the tread divided by the gross area of the entire circumference of the tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Normal Load" means the specific design inflation pressure and load assigned by the appropriate standards organization for the service condition for the tire.

"Normal Tensile Steel (NT)" means a carbon steel with a tensile strength of at least 2800 MPa at 0.20 mm filament diameter.

"Outboard side" means the side of the tire farthest away from the vehicle when the tire is mounted on a wheel and the wheel is mounted on the vehicle.

"Phr" means parts by weight of a respective material per 100 parts by weight of rubber or elastomer.

"Ply" means a cord-reinforced layer of rubber-coated radially deployed or otherwise parallel cords.

"Radial" and "radially" are used to mean directions radially toward or away from the axis of rotation of the tire.

"Radial Ply Structure" means the one or more carcass plies or which at least one ply has reinforcing cords oriented at an angle of between 65° and 90° with respect to the equatorial plane of the tire.

"Radial Ply Tire" means a belted or circumferentially-restricted pneumatic tire in which at least one ply has cords which extend from bead to bead are laid at cord angles between 65° and 90° with respect to the equatorial plane of the tire.

"Rib" means a circumferentially extending strip of rubber on the tread which is defined by at least one circumferential groove and either a second such groove or a lateral edge, the strip being laterally undivided by full-depth grooves.

"Rivet" means an open space between cords in a layer.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Self-supporting run-flat" means a type of tire that has a structure wherein the tire structure alone is sufficiently strong to support the vehicle load when the tire is operated in the uninflated condition for limited periods of time and limited speed. The sidewall and internal surfaces of the tire may not collapse or buckle onto themselves due to the tire structure alone (e.g., no internal structures).

"Sidewall insert" means elastomer or cord reinforcements located in the sidewall region of a tire. The insert may be an addition to the carcass reinforcing ply and outer sidewall rubber that forms the outer surface of the tire.

"Sidewall" means that portion of a tire between the tread and the bead.

"Sipe" or "incision" means small slots molded into the tread elements of the tire that subdivide the tread surface and improve traction; sipes may be designed to close when within the contact patch or footprint, as distinguished from grooves.

"Spring Rate" means the stiffness of tire expressed as the slope of the load deflection curve at a given pressure.

"Stiffness ratio" means the value of a control belt structure stiffness divided by the value of another belt structure stiffness when the values are determined by a fixed three point bending test having both ends of the cord supported and flexed by a load centered between the fixed ends.

"Super Tensile Steel (ST)" means a carbon steel with a tensile strength of at least 3650 MPa at 0.20 mm filament diameter.

"Tenacity" is stress expressed as force per unit linear density of the unstrained specimen (gm/tex or gm/denier). Used in textiles.

"Tensile" is stress expressed in forces/cross-sectional area. Strength in psi=12,800 times specific gravity times tenacity in grams per denier.

"Toe guard" refers to the circumferentially deployed elastomeric rim-contacting portion of the tire axially inward of each bead.

"Tread" means a molded rubber component which, when bonded to a tire casing, includes that portion of the tire that comes into contact with the road when the tire is normally inflated and under normal load.

"Tread element" or "traction element" means a rib or a block element.

"Tread width" means the arc length of the tread surface in a plane including the axis of rotation of the tire.

"Turnup end" means the portion of a carcass ply that turns upward (i.e., radially outward) from the beads about which the ply is wrapped.

"Ultra Tensile Steel (UT)" means a carbon steel with a tensile strength of at least 4000 MPa at 0.20 mm filament diameter.

"Vertical Deflection" means the amount that a tire deflects under load.

"Yarn" is a generic term for a continuous strand of textile fibers or filaments. Yarn occurs in the following forms: 1) a number of fibers twisted together; 2) a number of filaments laid together without twist; 3) a number of filaments laid together with a degree of twist; 4) a single filament with or without twist (monofilament); 5) a narrow strip of material with or without twist.

Description of Examples of the Present Invention

A performance gap may exist between high rolling resistance tread materials and high traction tread materials in a pneumatic tire. A tread in accordance with the present invention may address this gap and balance wet traction, rolling resistance, and tread wear. Such a tread may utilize vertical and horizontal cross-sectional splits to maximize wet traction (wet grip index (WGI), braking, water, handling), rolling resistance, and tread wear of a tire throughout its serviceable life. Such a tread provides a contoured shape allowing an upper wet tread compound remain in contact with the road even after wear. The BOT RR compound contributes to improve the Rolling Resistance performance.

The different areas of the tread do not equally contribute to the various tire performance characteristics. Thus, a tread in accordance with the present invention may place compound where the compounds can contribute the most its main advantage.

As shown in FIG. 1, a four rib tread 100 in accordance with the present invention may combine a first wet traction compound 110, a second low rolling resistance compound 120, a third intermediate ultra low rolling resistance compound 130, and a chimney structure/tread base 140 which may or may not be an integral structure for conducting static electrical charge to ground. The first compound 110 may contact the road on the left side (in FIG. 1) of the tread 100. The interface between the first compound 110 and the third compound 130 under the rib 149 may define a shape or contour 150 for allowing the first compound to remain in contact with the road continuously as the tread 100 wears while the third compound contributes to low rolling resistance with less wearing since the third compound does not contact the road until most of the first compound 110 and the second compound 120 have worn away. The second compound 120, while having low rolling resistance, is in contact with the road initially and provides better wear characteristics than the third compound 130. Alternatively, the second and third compounds 120, 130 may be the same compound.

As shown in FIG. 1, the contour 150 may have a protrusion 152 that extends radially inward into the third compound 130 more than the main body of the first compound 110 and the second compound 120. This protrusion 152 may allow the first compound 110 to provide the overall tread 100 with enhanced wet traction characteristics after the main body of the first compound and the second compound 120 have worn away.

As shown in FIG. 2, a five rib tread 200 in accordance with the present invention may combine a first wet traction compound 210, a second low rolling resistance compound 220, a third intermediate ultra low rolling resistance compound 230, and a chimney structure/tread base 240 which may or may not be an integral structure for conducting static electrical charge to ground. The first compound 210 may contact the road in the tread middle region (FIG. 2) of the tread 200. The interface between the first compound 210 and the third compound 230 under the ribs 249 may define a shape or contour 250 for allowing the first compound to remain in contact with the road continuously as the tread 100 wears while the third compound contributes to low rolling resistance with less wearing since the third compound does not contact the road until most of the first compound 210 and the second compound 220 have worn away. The second compound 220, while having low rolling resistance, is in contact with the road initially and provides better wear characteristics than the third compound 230. Alternatively, the second and third compounds 120, 130 may be the same compound.

As shown in FIG. 2, the contours 250 may have a protrusion 252 that extends radially inward more than the main body of the first compound 210 and the second compound 220. This protrusion 252 may allow the first compound 110 to provide the overall tread 100 with enhanced wet traction characteristics after the main body of the first compound and the second compound 220 have worn away.

Below is a description of other example tire structures as set out in US 2013/0048169 to Erceg et al., which is herein incorporated by reference. A pneumatic tire for use with such a tread 100, 200 may include a carcass and a rubber encapsulated belt layer between spaced apart relatively inextensible beads and sidewalls, as well as an innerliner layer. This example tread of the pneumatic tire may split two tread cap compounds not only in a horizontal or a vertical direction, but in both directions, in order to optimize rolling resistance and wet and dry traction. The pneumatic tire may have a ground contacting composite tread comprising a tread base layer, a ground contacting first tread cap layer radially outside of the tread base layer, a ground contacting second tread cap layer radially outside of the tread base layer and both radially outside and axially adjacent the first tread cap layer, a first tread skirt disposed at an inner tread edge of the pneumatic tire and axially adjacent the tread base layer and the first tread cap layer, and a second tread skirt disposed at an outer tread edge of the pneumatic tire and axially adjacent the tread base layer and the second tread cap layer. The axially outer end portion of the second tread cap layer also extends radially inward to a junction of the tread base layer, the first tread cap layer, and the second tread skirt.

The tread may be a co-extruded, multi-component rubber extrudate and may be prepared by co-extruding at least two different rubber compositions by using an individual extruder for each rubber composition which individually cause an extruded rubber composition to flow through a suitable die member to, in turn, cause the individual rubber compositions to controllably flow and join within the die member and exit therefrom in a profiled multi-component rubber extrudate. Thus, the first cap layer may be extruded as a unitary extrudate of a single rubber compound in one extruder and the second cap layer may be extruded by another extruder.

The tread base layer, first tread cap layer, second tread cap layer, first tread skirt, and/or second tread skirt may exemplarily comprise at least one conjugated diene-based elastomer and from about 30 phr to about 70 phr of rubber reinforcing filler selected from carbon black and precipitated silica wherein the filler comprises from about 30 phr to about 80 phr of said carbon black and from zero to 40 phr of precipitated silica. The tread base layer, first tread cap layer, second tread cap layer, first tread skirt, and/or second tread skirt may exemplarily further comprise about 50 phr to about 80 phr carbon black. The tread base layer, first tread cap layer, second tread cap layer, first tread skirt, and/or second tread skirt may exemplarily further comprise about 10 phr to about 25 phr precipitated silica. The tread base layer, first tread cap layer, second tread cap layer, first tread skirt, and/or second tread skirt may exemplarily further comprise a fully rubber reinforcing carbon black. The tread base layer, first tread cap layer, second tread cap layer, first tread skirt, and/or second tread skirt may exemplarily further comprise additives, such as curatives, processing aids, antidegradants, etc.

The tread base layer, first tread cap layer, second tread cap layer, first tread skirt, and/or second tread skirt may exemplarily further be characterized as having specific physical properties making it suitable for use in the pneumatic tire. The tread base layer, first tread cap layer, second tread cap layer, first tread skirt, and/or second tread skirt may exemplarily have a tan delta ranging from 0.1 to 0.2, a storage modulus ranging from 4 MPa to 13 MPa, and a shore A hardness ranging from 45 to 70. Tan delta and storage modulus $E^*$ may be measured by viscoelastic spectrometer at 70° C. Shore A hardness may be measured according to DIN 53505 at room temperature.

The tread base layer, first tread cap layer, second tread cap layer, first tread skirt, and/or second tread skirt may exemplarily further comprise at least one conjugated diene-based elastomer and a reinforcing filler comprising about 50 phr to about 80 phr precipitated silica and about 10 phr to about 40 phr carbon black. As stated above, the tread base layer, first tread cap layer, second tread cap layer, first tread skirt, and/or second tread skirt may exemplarily further comprise additives, such as curatives, processing aids, antidegradants, etc.

Alternatively, the tread base layer, first tread cap layer, second tread cap layer, first tread skirt, and/or second tread skirt may exemplarily further be characterized as having specific physical properties making it suitable for use in the pneumatic tire. The tread base layer, first tread cap layer, second tread cap layer, first tread skirt, and/or second tread skirt may exemplarily further have a tan delta ranging from 0.05 to 0.20, a storage modulus ranging from 4 MPa to 12 MPa, and a shore A hardness ranging from 50 to 75.

The tread base layer, first tread cap layer, second tread cap layer, first tread skirt, and/or second tread skirt may exemplarily further be used with rubbers or elastomers containing olefinic unsaturation. The phrases "rubber" or "elastomer containing olefinic unsaturation" or "conjugated diene-based elastomer" are intended to include both natural rubber and its various raw and reclaimed forms, as well as various synthetic rubbers. The terms "rubber" and "elastomer" may be used interchangeably, unless otherwise prescribed. The terms "rubber composition", "compounded rubber", and "rubber compound" may be used interchangeably to refer to rubber which has been blended or mixed with various ingredients and materials for use in the rubber mixing or rubber compounding. Representative synthetic polymers may be the homopolymerization products of butadiene and its homologues and derivatives, for example, methylbutadiene, dimethylbutadiene, and pentadiene, as well as copolymers such as those formed from butadiene or its homologues or derivatives with other unsaturated monomers. Among the latter may be acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid, and styrene. The latter compound may polymerize with butadiene to form SBR, as well as vinyl esters and various unsaturated aldehydes, ketones, and ethers, e.g., acrolein, methyl isopropenyl ketone, and vinylethyl ether. Specific examples of synthetic rubbers may include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile, and methyl methacrylate, as well as ethylene/propylene terpolymers, also known as ethylene/propylene/diene monomer (EPDM), and ethylene/propylene/dicyclopentadiene terpolymers. Additional examples of rubbers may include silicon-coupled and tin-coupled star-branched polymers.

The tread base layer, first tread cap layer, second tread cap layer, first tread skirt, and/or second tread skirt may exemplarily further comprise at least two of diene based rubbers, e.g., a combination of two or more rubbers such as cis 1,4-polyisoprene rubber (natural or synthetic), 3,4-polyisoprene rubber, styrene/isoprene/butadiene rubber, emulsion, and solution polymerization derived styrene/butadiene rubbers, cis 1,4-polybutadiene rubbers and emulsion polymerization prepared butadiene/acrylonitrile copolymers.

An emulsion polymerization may be derived styrene/butadiene (E-SBR) having a styrene content of 20 percent bound styrene to about 28 percent bound styrene or an E-SBR having a medium to relatively high bound styrene content, e.g., a bound styrene content of about 30 percent to about 45 percent. The styrene content of about 30 percent to about 45 percent for the E-SBR may be beneficial for enhancing traction, or skid resistance, of the tread 10. The presence of the E-SBR itself may be beneficial for enhancing processability of the uncured elastomer composition mixture, especially in comparison to a utilization of a solution polymerization prepared SBR (S-SBR).

An emulsion polymerization prepared E-SBR may be styrene and 1,3-butadiene copolymerized as an aqueous emulsion. The bound styrene content may vary, for example, from about 5 percent to about 50 percent. The E-SBR may also contain acrylonitrile to form a terpolymer rubber, such as E-SBAR, in amounts, for example, of about 2 weight percent acrylonitrile to about 30 weight percent bound acrylonitrile in the terpolymer. Diene based rubbers for use in the pneumatic tire 1 may be emulsion polymerization prepared styrene/butadiene/acrylonitrile copolymer rubbers containing about 2 weight percent bound acrylonitrile to about 40 weight percent bound acrylonitrile in the copolymer.

The solution polymerization prepared SBR (S-SBR) may have a bound styrene content from about 5 percent to about 50 percent or about 9 percent to about 36 percent. The S-SBR may be prepared, for example, by organo lithium catalyzation in the presence of an organic hydrocarbon solvent. The S-SBR may improve tire rolling resistance as a result of lower hysteresis when it is used in the tread 10.

The 3,4-polyisoprene rubber (3,4-PI) in the tread 10 may enhance traction. The 3,4-PI and use thereof is more fully described in U.S. Pat. No. 5,087,668 which is incorporated herein by reference. Tg is the glass transition temperature which may be determined by a differential scanning calorimeter at a heating rate of 10° C. per minute.

The cis 1,4-polybutadiene rubber (BR) in the tread 10 may enhance tire treadwear and rolling resistance. BR may be prepared, for example, by organic solution polymerization of 1,3-butadiene. Further, BR may have at least 90 percent cis 1,4 content. The rubber compositions may additionally contain a sulfur containing organosilicon compound, such as:

Z-Alk-$S_n$-Alk-Z in which Z is selected from the group consisting of

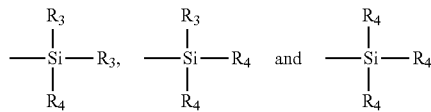

where $R_3$ is an alkyl group of 1 to 4 carbon atoms, cyclohexyl, or phenyl; $R_4$ is alkoxy of 1 to 8 carbon atoms, or cycloalkoxy of 5 to 8 carbon atoms; Alk is a divalent hydrocarbon of 1 to 18 carbon atoms and n is an integer between 2 and 8.

Examples of sulfur containing organosilicon compounds may include: 3,3'-bis(trimethoxysilylpropyl)disulfide; 3,3'-bis(triethoxysilylpropyl)disulfide; 3,3'-bis(triethoxysilylpropyl)tetrasulfide; 3,3'-bis(triethoxysilylpropyl) octasulfide; 3,3'-bis(trimethoxysilylpropyl)tetrasulfide; 2,2'-bis(triethoxysilylethyl)tetrasulfide; 3,3'-bis(trimethoxysilylpropyl) trisulfide; 3,3'-bis(triethoxysilylpropyl)trisulfide; 3,3'-bis(tributoxysilylpropyl)disulfide; 3,3'-bis(trimethoxysilylpropyl) hexasulfide; 3,3'-bis(trimethoxysilylpropyl) octasulfide; 3,3'-bis(trioctoxysilylpropyl)tetrasulfide; 3,3'-bis(trihexoxysilylpropyl)disulfide; 3,3-bis(tri-2"-ethylhexoxysilylpropyl)trisulfide; 3,3'-bis(triisooctoxysilylpropyl)tetrasulfide; 3,3'-bis(tri-t-butoxysilylpropyl)disulfide; 2,2'-bis(methoxy diethoxy silyl ethyl)tetrasulfide; 2,2'-bis(tripropoxysilylethyl)pentasulfide; 3,3'-bis(tricycloethoxysilylpropyl)tetrasulfide; 3,3'-bis(tricyclopentoxysilylpropyl)trisulfide; 2,2'-bis(tri-2"-methylcyclohexoxysilylethyl)tetrasulfide; bis(trimethoxysilylmethyl) tetrasulfide; 3-methoxy ethoxy propoxysilyl 3'-diethoxybutoxy-silylpropyltetrasulfide; 2,2'-bis(dimethyl methoxysilylethyl)disulfide; 2,2'-bis(dimethyl sec.butoxysilylethyl)trisulfide; 3,3'-bis(methyl butylethoxysilylpropyl) tetrasulfide; 3,3'-bis(di t-butylmethoxysilylpropyl)tetrasulfide; 2,2'-bis(phenyl methyl methoxysilylethyl)trisulfide; 3,3'-bis(diphenyl isopropoxysilylpropyl)tetrasulfide; 3,3'-bis (diphenyl cyclohexoxysilylpropyl)disulfide; 3,3'-bis(dimethyl ethylmercaptosilylpropyl)tetrasulfide; 2,2'-bis(methyl dimethoxysilylethyl)trisulfide; 2,2'-bis(methyl ethoxypropoxysilylethyl)tetrasulfide; 3,3'-bis(diethyl methoxysilylpropyl)tetrasulfide; 3,3'-bis(ethyl di-sec. butoxysilylpropyl)disulfide; 3,3'-bis(propyl diethoxysilylpropyl)disulfide; 3,3'-bis (butyl dimethoxysilylpropyl)trisulfide; 3,3'-bis(phenyl dimethoxysilylpropyl)tetrasulfide; 3-phenyl ethoxybutoxysilyl 3'-trimethoxysilylpropyl tetrasulfide; 4,4'-bis(trimethoxysilylbutyl)tetrasulfide; 6,6'-bis(triethoxysilylhexyl)tetrasulfide; 12,12'-bis(triisopropoxysilyl dodecyl)disulfide; 18,18'-bis(trimethoxysilyloctadecyl)tetrasulfide; 18,18'-bis (tripropoxysilyloctadecenyl)tetrasulfide; 4,4'-bis (trimethoxysilyl-buten-2-yl)tetrasulfide; 4,4'-bis (trimethoxysilylcyclohexylene)tetrasulfide; 5,5'-bis (dimethoxymethylsilylpentyl)trisulfide; 3,3'-bis (trimethoxysilyl-2-methylpropyl)tetrasulfide; and 3,3'-bis (dimethoxyphenylsilyl-2-methylpropyl)disulfide.

Sulfur containing organosilicon compounds may include: 3,3'-bis(trimethoxy or triethoxy silylpropyl) sulfides; 3,3'-bis(triethoxysilylpropyl)disulfide; and 3,3'-bis(triethoxysilylpropyl)tetrasulfide. Therefore, for the above formula, Z may be

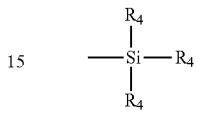

where $R_4$ is an alkoxy of 2 to 4 carbon atoms; alk is a divalent hydrocarbon of 2 to 4 carbon atoms; and n is an integer from 2 to 5.

The amount of the sulfur containing organosilicon compound in the above formula in a rubber composition may vary depending on the level of other additives. The amount of the compound in the above formula may range from 0.5 phr to 20.0 phr or 1.0 phr to 10.0 phr. Fillers such as silica and carbon black may also be present.

Siliceous pigments in the rubber compound may include pyrogenic and precipitated siliceous pigments (silica) and precipitated silicas, such as, for example, those obtained by the acidification of a soluble silicate, e.g., sodium silicate. Such silicas may be characterized, for example, as having a BET surface area, as measured using nitrogen gas, in the range of about 40 to about 600 or about 50 to about 300 square meters per gram.

Silica may also be characterized as having a dibutylphthalate (DBP) absorption value in a range of about 100 to about 400 or about 150 to about 300. The silica may have an average ultimate particle size, for example, of 0.01 microns to 0.05 microns, as determined by an electron microscope.

Various commercially available silicas may be used, such as, only for example herein, and without limitation: silicas commercially available from PPG Industries under the Hi-Sil trademark with designations 210, 243, etc; silicas available from Rhone-Poulenc, with, for example, designations of Z1165MP and Z165GR; and silicas available from Degussa AG with, for example, designations VN2 and VN3.

Representative examples of carbon blacks may include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990, and N991. These carbon blacks may have iodine absorptions ranging from 9 g/kg to 145 g/kg and a DBP number ranging from 34 $cm^3$/100 g to 150 $cm^3$/100 g.

The rubber composition may be compounded by various methods, such as mixing the various sulfur-vulcanizable constituent rubbers with various additive materials, such as, for example, sulfur donors, curing aids, such as activators and retarders and processing additives, such as oils, resins including tackifying resins and plasticizers, fillers, pigments, fatty acid, zinc oxide, waxes, antioxidants and antiozonants, and peptizing agents. Examples of sulfur donors may include: elemental sulfur (free sulfur); an amine disulfide; polymeric polysulfide; and sulfur olefin adducts. The sulfur vulcanizing agent may be elemental sulfur. The sulfur vulcanizing agent may range from 0.5 phr to 8.0 phr or from 1.5 phr to 6.0 phr.

Tackifier resins may comprise about 0.5 phr to about 10.0 phr or about 1.0 phr to about 5.0 phr. Processing aids may comprise about 1 phr to about 50 phr. Such processing aids may include, for example, aromatic, naphthenic, paraffinic processing oils, and/or low PCA oils characterized by a polycyclic aromatic content of less than 3% (IP 346 method); such low PCA oils may include MES, TDAE, and heavy naphthenic oils.

Amounts of antioxidants may comprise about 1 phr to about 5 phr. Antioxidants may be, for example, diphenyl-p-phenylenediamine. Amounts of antiozonants may comprise about 1 phr to about 5 phr. Amounts of fatty acids may include stearic acid having about 0.5 phr to about 3.0 phr. Amounts of zinc oxide may about 2 phr to about 5 phr. Amounts of waxes may comprise about 1 phr to about 5 phr. Microcrystalline waxes may be used. Amounts of peptizers may comprise about 0.1 phr to about 1 phr. Peptizers may be, for example, pentachlorothiophenol and dibenzamidodiphenyl disulfide. The sulfur vulcanizable rubber composition may then be sulfur-cured or vulcanized.

Accelerators may control the time and/or temperature required for vulcanization and improvement of the properties of the vulcanizate. A single accelerator system may be used, e.g., a primary accelerator. The primary accelerator(s) may have amounts ranging from about 0.5 phr to about 4 phr or about 0.8 phr to about 1.5 phr. Combinations of a primary and a secondary accelerator may be used with the secondary accelerator having from about 0.05 phr to about 3.00 phr in order to activate and improve the properties of the vulcanizate. Combinations of these accelerators may produce a synergistic effect on the final properties better than those produced by use of either accelerator alone. In addition, delayed action accelerators may be used which are not affected by normal processing temperatures but produce a satisfactory cure at ordinary vulcanization temperatures. Vulcanization retarders may also be used. Suitable accelerators may be amines, disulfides, guanidines, thioureas, thiazoles, thiurams, sulfenamides, dithiocarbamates, and xanthates. The primary accelerator may be a sulfenamide. The secondary accelerator may be a guanidine, dithiocarbamate, or thiuram compound.

The ingredients of the rubber composition may be mixed in two stages—at least one non-productive stage followed by a productive mix stage. The final curatives may include sulfur vulcanizing agents mixed in the final stage (e.g., the "productive" mix stage in which the mixing occurs at a temperature, or ultimate temperature, lower than the mix temperature(s) than preceding non-productive mix stages). The rubber may be mixed in one or more non-productive mix stages.

A rubber composition containing the sulfur-containing organosilicon compound may be subjected to a thermomechanical mixing step. The thermomechanical mixing step may comprise a mechanical working in a mixer or extruder for a period of time suitable for producing a rubber temperature between 140° C. and 190° C. The appropriate duration of the thermomechanical working may vary as a function of the operating conditions and the volume and nature of the components. For example, the thermomechanical working may be from 1 minute to 20 minutes.

Vulcanization of the rubber composition may generally be carried out at temperatures ranging from about 100° C. to about 200° C. The vulcanization may also be conducted at temperatures ranging from about 110° C. to about 180° C. Other vulcanization processes, such as heating in a press or mold, heating with superheated steam or hot air, or heated with superheated steam in a salt bath, may be used.

The pneumatic tire may be built, shaped, molded, and cured by various methods. The pneumatic tire may be a passenger tire, aircraft tire, truck tire, etc. The pneumatic tire 1 may also be radial or bias.

While certain representative examples and details have been shown for the purpose of illustrating the present invention, it will be apparent to those skilled in this art that various changes and modifications may be made therein without departing from the spirit and scope of the present invention.

What is claimed:

1. A five rib tread for a pneumatic tire comprising:
a tread base layer;
a first tread cap layer radially outside of the tread base layer;
a second tread cap layer radially outside of the tread base layer and both radially outside and axially adjacent the first tread cap layer;
a third intermediate layer radially between the tread base layer and the first and second tread cap layers,
the first tread cap layer having a first protrusion and a second protrusion each extending radially inward and into the third intermediate layer more than a main body of the first tread cap layer and the second tread cap layer thereby allowing the first tread cap layer to provide the overall tread with enhanced performance characteristics after the main body of the first tread cap layer and the second tread cap layer have worn away,
the first protrusion and the second protrusion each extending radially inward from two ribs of the five rib tread.

2. The tread as set forth in claim 1 wherein the tread base layer comprises a rubber composition comprising a diene based elastomer having from 20 part by weight to 150 part by weight, per 100 parts by weight of elastomer, of carbon black.

3. The tread as set forth in claim 1 wherein the second tread cap layer comprises a diene based elastomer having from 20 parts by weight to 100 parts by weight, per 100 parts by weight of elastomer, of silica.

4. The tread as set forth in claim 1 wherein the tread base layer has a tan delta ranging from 0.1 to 0.2, a storage modulus ranging from 4 MPa to 13 MPa, and a shore A hardness ranging from 45 to 70.

5. The tread as set forth in claim 1 wherein the second tread cap layer has a tan delta ranging from 0.05 to 0.20, a storage modulus ranging from 4 MPa to 12 MPa, and a shore A hardness ranging from 50 to 75.

6. The tread as set forth in claim 1 wherein the second tread cap layer comprises 50 phr to 80 phr carbon black.

7. The tread as set forth in claim 1 wherein the second tread cap layer comprises 10 phr to 25 phr precipitated silica.

8. The tread as set forth in claim 1 wherein the second tread cap layer comprises a conjugated diene-based elastomer and a reinforcing filler having 50 phr to 80 phr precipitated silica and 10 phr to 40 phr carbon black.

* * * * *